(12) United States Patent
Inui et al.

(10) Patent No.: US 7,157,147 B2
(45) Date of Patent: Jan. 2, 2007

(54) GAS-BARRIER FILM AND GAS-BARRIER COATING AGENT, AND METHOD FOR PRODUCTION THEREOF

(75) Inventors: Yoji Inui, Hikari (JP); Naoto Mochizuki, Shunan (JP); Isao Masada, Shunan (JP); Ryuji Ishimoto, Shunan (JP); Hideki Umekawa, Shunan (JP); Hironori Honda, Shunan (JP); Yoshihiro Kimura, Kudamatsu (JP)

(73) Assignees: Tokuyama Corporation, Yamaguchi (JP); Sun-Tox Co., Ltd., Tokyo (JP)

( * ) Notice: Subject to any disclaimer, the term of this patent is extended or adjusted under 35 U.S.C. 154(b) by 256 days.

(21) Appl. No.: 10/490,162

(22) PCT Filed: Sep. 13, 2002

(86) PCT No.: PCT/JP02/09453

§ 371 (c)(1),
(2), (4) Date: Mar. 18, 2004

(87) PCT Pub. No.: WO03/024714

PCT Pub. Date: Mar. 27, 2003

(65) Prior Publication Data

US 2004/0253463 A1    Dec. 16, 2004

(30) Foreign Application Priority Data

| Sep. 18, 2001 | (JP) | 2001-283182 |
| Sep. 18, 2001 | (JP) | 2001-283647 |
| Oct. 1, 2001 | (JP) | 2001-305127 |
| Oct. 19, 2001 | (JP) | 2001-321922 |
| Mar. 26, 2002 | (JP) | 2002-086502 |
| Aug. 8, 2002 | (JP) | 2002-231585 |
| Aug. 19, 2002 | (JP) | 2002-238056 |

(51) Int. Cl.
B32B 27/30 (2006.01)
C08J 7/04 (2006.01)
C09D 129/04 (2006.01)

(52) U.S. Cl. .......... 428/451; 427/341; 427/343; 427/344; 427/387; 427/397.7; 524/446

(58) Field of Classification Search ........ 427/341, 427/343, 344, 387, 397.7; 428/451; 524/446
See application file for complete search history.

(56) References Cited

U.S. PATENT DOCUMENTS 6,596,807 B1 * 7/2003 Oshita et al. ............ 524/557

FOREIGN PATENT DOCUMENTS

EP    805177    11/1997

(Continued)

*Primary Examiner*—D. S. Nakarani
(74) *Attorney, Agent, or Firm*—Wenderoth, Lind & Ponack, L.L.P.

(57) ABSTRACT

Provided are a gas-barrier film which is a laminate comprising a substrate layer comprising a thermoplastic resin film and a gas-barrier layer comprising a hydrolysate of a silicon alkoxide, a stratified silicate and a polyvinyl alcohol base resin, wherein a radius (Rg) of gyration of a scattering matter which is measured by light scattering in the gas-barrier layer described above is 2.4 μm or less, and the silicon alkoxide and/or the hydrolysate thereof are present between the layers of the stratified silicate present in the above gas-barrier layer. The above film shows an excellent gas-barrier property even under such a high humidity as exceeding 90% RH.

20 Claims, 1 Drawing Sheet

FOREIGN PATENT DOCUMENTS

| | | |
|---|---|---|
| EP | 0 899 308 | 3/1999 |
| JP | 56-4563 A | 1/1981 |
| JP | 6-192454 A | 7/1994 |
| JP | 11-165369 | 6/1999 |
| JP | 2000-43219 A | 2/2000 |
| JP | 2001-277443 | 10/2001 |
| WO | 00/49072 | 8/2000 |

* cited by examiner

GAS-BARRIER FILM AND GAS-BARRIER COATING AGENT, AND METHOD FOR PRODUCTION THEREOF

TECHNICAL FIELD

The present invention relates to a gas-barrier film which is excellent in a gas-barrier property. More specifically, it relates to a gas-barrier film which can maintain a very high gas-barrier property even under a high humidity.

BACKGROUND ART

Thermoplastic resin films such as a polypropylene film, a polyethylene terephthalate film and a nylon film are widely used as a packaging film because of excellent transparency, mechanical strength, processing aptitude and secondary processing property such as a bag-forming property.

For the purpose of providing the film described above with a gas-barrier function such as an oxygen-barrier property, a layer comprising a resin having a gas-barrier property such as a vinylidene chloride resin and a polyvinyl alcohol base resin is laminated on the surface of the above thermoplastic resin film.

However, the vinylidene chloride resin is excellent in a gas-barrier property but has a demerit on an incinerating property and a disposing property since it is a chlorine base resin. The polyvinyl alcohol base resin is excellent in an oxygen-barrier property in a dry state but has the problem that it is extremely reduced in an oxygen-barrier property under a high humidity by absorption of humidity.

Accordingly, devices such as cross-linking, modification treatment and combination with other compounds are tried. For example, a gas-barrier film prepared by providing a coating layer comprising a silica/polyvinyl alcohol base combined polymer on a thermoplastic resin film is disclosed in Japanese Patent Application Laid-Open No. 4563/1981. Further, disclosed in Japanese Patent Application Laid-Open No. 192454/1994 is a gas-barrier film prepared by providing a coating film comprising a combined product of metal alkoxide or a hydrolysate of metal alkoxide and a water-soluble resin having a hydroxyl group such as polyvinyl alcohol on a thermoplastic resin film.

However, the gas-barrier films described in Japanese Patent Application Laid-Open No. 4563/1981 and Japanese Patent Application Laid-Open No. 192454/1994 are improved in the problem that an oxygen-barrier property under a high humidity is extremely reduced by absorption of humidity, but the existing situation has been that the gas-barrier effect thereof is not satisfactory particularly under such high humidity as exceeding 90% RH.

Also, a gas-barrier film prepared by providing a coating film comprising a combined product of a water-soluble resin having a hydroxyl group such as polyvinyl alcohol, an inorganic stratified compound and a hydrolysate of metal alkoxide on a thermoplastic resin film is disclosed as a film which is further improved in a gas-barrier performance in the gas-barrier layer described above comprising the combined product in Japanese Patent Application Laid-Open No. 43219/2000. In such gas-barrier film, however, there has still been a room for improving a gas-barrier property under a high humidity and a gas-barrier property after boiling in hot water after providing a sealing layer.

Accordingly, an object of the present invention is to provide a gas-barrier film which shows a very excellent gas-barrier property even under such high humidity as exceeding 90% RH and which is excellent as well in a gas-barrier property after boiling.

DISCLOSURE OF THE INVENTION

The present inventors have repeated intensive researches in order to achieve the object described above. As a result thereof, they have found that in a gas-barrier layer obtained by coating a gas-barrier coating agent comprising an aqueous solution obtained by hydrolyzing silicon alkoxide in the presence of stratified silicate dispersed in an aqueous solution of a polyvinyl alcohol base resin on specific conditions, silicon based on silicon alkoxide and/or a hydrolysate thereof is confirmed to be present between the layers of the above stratified silicate, which is different from a gas-barrier layer comprising the same components which has so far been proposed and that it is considered to be attributable to that a coagulated matter of the hydrolysate of silicon alkoxide, the stratified silicate and the polyvinyl alcohol base resin is finely disperses as a structure (scattering matter) having a size which scatters light in the gas-barrier layer described above, which results in finding that a dispersion state of the scattering matter by light scattering in the gas-barrier layer described above can be controlled in a specific range, whereby the gas-barrier property is very notably improved, and they have come to complete the present invention.

Thus, according to the present invention, provided is a gas-barrier film which is a laminate comprising a substrate layer comprising a thermoplastic resin film and a gas-barrier layer comprising a hydrolysate of a silicon alkoxide, a stratified silicate and a polyvinyl alcohol base resin, wherein a radius (Rg) of gyration of a scattering matter which is measured by light scattering in the gas-barrier layer described above is 2.4 µm or less, and the silicon alkoxide and/or a hydrolysate thereof are present between the layers of the stratified silicate present in the above gas-barrier layer.

According to the present invention, provided as well is a film endowed with a very excellent gas-barrier property even after boiling in hot water, which has not so far been achieved, by laminating a sealing layer comprising a thermoplastic resin having a low melting point on a face opposite to a face on which the substrate layer in the gas-barrier layer of the gas-barrier film is laminated.

In the present invention, the radius (Rg) of gyration of the scattering matter which is measured by light scattering in the gas-barrier layer is an index showing an uneven structure (optical unevenness) of the gas-barrier layer and is a value determined from a Guinier plot of a Vv scattering intensity. To be specific, assuming that a radius of gyration of a particle (scattering matter) scattering light is Rg, a scattering intensity I(q) is given by the following equation in a small angle area (in the vicinity in which a scattered vector q is 0):

$$I(q)=I_{(q=0)}\exp(-Rg^2 q^2/3)$$

The equation described above applies to scattering matters having all forms, and a radius (Rg) of gyration of the scattering matter can be determined from a gradient of a Guinier plot (ln I(q) vs. $q^2$) at a small angle side (A. Guinier and G. Fournet, "Small-Angle Scattering of X-rays", J. Wiley & Sons, Inc., N.Y. (1955), pp. 102).

The gas-barrier film of the present invention has a Vv scattering intensity which is far large as compared with a Vv scattering intensity from a thermoplastic resin film which is a substrate layer and an anchor coat layer and a sealing layer which are provided if necessary.

Further, a strong azimuth angle dependency (anisotropy of a substrate) is observed in a Vv scattering intensity of the substrate layer, but Vv scattering of the gas-barrier film laminated thereon with the gas-barrier layer of the present invention is isotropic, and an azimuth angle dependency is not observed. From the matters described above, scattering from the substrate layer can be ignored in Vv scattering of the gas-barrier film of the present invention, and scattering can be regarded as coming only from the gas-barrier layer.

Further, an optical anisotropy is not present in the gas-barrier layer, and Vv scattering can be handled as scattering coming only from a difference in an optical density of the gas-barrier layer. Accordingly, it is possible to evaluate an unevenness of the gas-barrier layer from light scattering measurement of the gas-barrier film including the substrate layer.

Rg described above is an index showing an unevenness of solid matters contained in the gas-barrier layer, and smaller Rg shows a structure in which the solid matters are evenly and finely dispersed in the gas-barrier layer.

Embodiments of the Invention

The gas-barrier film of the present invention comprises two embodiments. The first embodiment is a laminate comprising a substrate layer comprising a thermoplastic resin film and laminated thereon, a gas-barrier layer comprising a hydrolysate of silicon alkoxide, a stratified silicate and a polyvinyl alcohol base resin, and the second embodiment is a laminate in which a sealing layer is provided on a face opposite to a face laminated thereon with the substrate layer in the gas-barrier layer in the first embodiment.

The gas-barrier film of the present invention may be provided with an outermost layer and other layers between the layers without any specific restrictions as long as the layer structure described above is maintained. To be specific, the layers provided between the layers include an anchor coat layer and an adhesive layer which shall be described later, and the outermost layer and the layers provided between the layers include a printing layer.

In the present invention, it is important that Rg measured by light scattering which shows the degree of dispersion of the solid matters in the gas-barrier layer described above is 2.4 μm or less, preferably 2.3 μm or less.

That is, if Rg exceeds 2.4 μm, the dispersion state of the scattering matter including the stratified silicate is not satisfactory, and it is difficult to obtain the gas-barrier film having a high oxygen-barrier property. Such dispersion state of the scattering matter is not a value which is achieved merely by finely dispersing the stratified silicate, and the dispersion state of the polyvinyl alcohol base resin and the hydrolysate of the silicon alkoxide which are measured as the other scattering matters is related as well thereto.

In the gas-barrier film of the present invention, the structure of the scattering matter giving Rg measured by light scattering has not yet been clarified, but it is in a region where the orientation of the stratified silicate is disturbed, and it is considered that Rg is related to the size thereof. When the fine structure of the gas-barrier layer is observed under TEM (transmission electron microscope) and FE-TEM (field emission type transmission electron microscope) described below, a structure in which the stratified silicate is well oriented parallel to the film in the inside of the gas-barrier layer can be observed. It can be confirmed that a region in which the orientation of the stratified silicate is disturbed (waved) in a frequency of a several μm order is present, and this region becomes an optically uneven structure to scatter light. It is estimated that a size of this region is related to Rg measured by light scattering. That is, when Rg is large, the size of the region in which the orientation of the stratified silicate is disturbed and the disturbance of the orientation are large, and a labyrinth effect which is one requisite for revelation of the gas-barrier property by the stratified silicate and the homogeneity of the gas-barrier layer are damaged. On the other hand, when Rg is small, the region in which the orientation of the stratified silicate is disturbed is small, and the disturbance of the orientation is small as well. Accordingly, the labyrinth effect is large, and the gas-barrier layer is homogeneous and excellent in a gas-barrier property. In particular, it is considered that Rg is as very small as 2.4 μm or less in the gas-barrier film of the present invention, so that the excellent gas-barrier property can be exhibited.

In the gas-barrier film of the present invention, the silicon alkoxide and/or the hydrolysate thereof are present between at least a part of the layers in the stratified silicate described above in the gas-barrier layer comprising the hydrolysate of the silicon alkoxide, the stratified silicate and the polyvinyl alcohol base resin each described above. The gas-barrier film of the present invention exhibits an excellent gas-barrier property in combination with the dispersion state of the scattering matter described above by maintaining the structure described above.

That is, the silicon alkoxide and/or the hydrolysate thereof are present, though the accurate reason therefor is unknown, between the layers in the stratified silicate described above in the gas-barrier layer, whereby a distance between the layers in the stratified silicate is increased, and the effects such as a reduction in a proportion of a phase in which the stratified silicate is rich and a reduction in a proportion of a phase in which the vinyl alcohol base resin is rich are obtained. It is considered that as result thereof, the specific structure shown by a radius (Rg) of gyration of 2.4 μm or less is formed to make it possible to exhibit the very high gas-barrier property which has not so far been achieved.

In the gas-barrier layer described above, the presence of the silicon alkoxide and/or the hydrolysate thereof between the layers in the stratified silicate can be confirmed by cutting a ultra-thin section out of the cross section of the gas-barrier layer by means of a ultramicrotome and observing it under FE-TEM (field emission type transmission electron microscope) having an STEM (scanning transmission electron microscope) function to confirm the presence of the above space between the layers, and it can be confirmed from the patterns (element mapping) showing a dispersion concentration of elements originating in the stratified silicate contained in the gas-barrier layer and a dispersion concentration of silicon by elemental analysis by means of EDS (energy dispersion type X-ray analytical apparatus) installed in the FE-TEM described above.

In the attached drawings.

Figure 1:
FIG. 1 is a drawing showing an analytical result obtained by FE-TEM regarding the structure of the gas-barrier layer in the gas-barrier film obtained in Example 1.

A structure in which the stratified silicate is finely dispersed in a thickness of 1 to 2 nm and oriented almost parallel to the film surface can be observed from FIG. 1, and a space between the layers can be confirmed to be present. In this case, it can be found that the space between the layers is about 10 to 20 nm. In the present invention, such space between the layers of the stratified silicate present in the gas-barrier layer is different according to the kind thereof, and it is preferably 5 to 100 nm.

Figure 2:
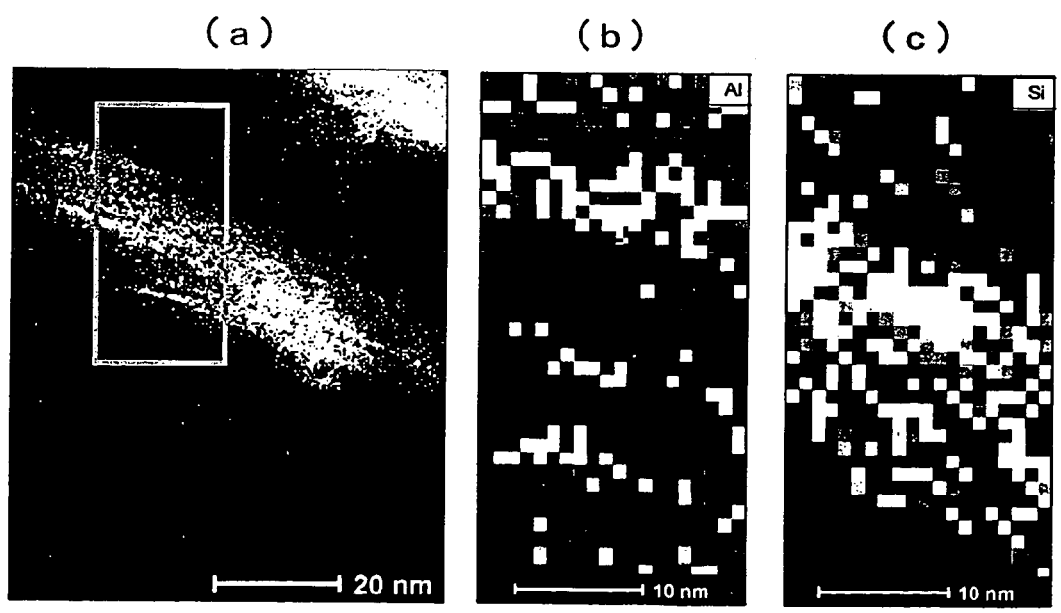
FIG. 2 is a drawing showing an analytical result obtained by FDS regarding the structure of the stratified silicate contained in the gas-barrier layer in the gas-barrier film obtained in Example 1 of the present invention.

FIG. 2(a) is a dark field image through STEM, and a part having a high element density is observed to be brighter (light and darkness are reversed to an FE-TEM image in FIG. 1). FIG. 2(b) and FIG. 2(c) each show the results of element mapping in aluminum and silicon in regions surrounded with white lines in FIG. 2(a). A part observed to be bright in FIG. 2(b) is a pattern showing the distribution of aluminum which is an element intrinsically contained in montmorillonite which is the stratified silicate, and it agrees with the distribution of the stratified silicate. On the other hand, FIG. 2(c) is a pattern showing the distribution of silicon, and silicon is apparently strongly observed in a space (a region in which aluminum is not observed) between the layers in the stratified silicate, and it can be confirmed from the above matter that the silicon alkoxide and/or the hydrolysate thereof are present in a space between the layers in the stratified silicate.

In the present invention, it is difficult to specify a proportion of the hydrolysate present in the gas-barrier layer from the analysis described above, but it is estimated from the production conditions that almost all of the silicon alkoxide is turned into the hydrolysate in the gas-barrier film of the present invention.

In the gas-barrier film of the present invention, the film in which an oxygen permeability (Q; $ml/m^2 \cdot day \cdot atm$) measured at a temperature of 23° C., a humidity of 90% RH at a substrate layer side and a humidity of 90% RH at a sealing layer side satisfies the following equation (1) can be obtained by the structure described above, and such embodiment is particularly preferred:

$$Q \leq 2.5/(\gamma/90 + \alpha) \quad (1)$$

wherein α represents a thickness (μm) of the gas-barrier layer, and γ represents a thickness (μm) of the gas-barrier film.

In the gas-barrier film of the present invention in which a sealing layer is provided on the surface of the gas-barrier layer, the film in which an oxygen permeability (Q'; $ml/m^2 \cdot day \cdot atm$) measured at a temperature of 23° C., a humidity of 90% RH at a substrate layer side and a humidity of 90% RH at a sealing layer side after left standing in hot water of a temperature of 90° C. satisfies the following equation (2) can be obtained, and such embodiment is particularly preferred:

$$Q' \leq 100/(\gamma/90 + \alpha) \quad (2)$$

wherein α represents a thickness (μm) of the gas-barrier layer, and γ represents a thickness (μm) of the gas-barrier film.

In the equation (1) and the equation (2) described above, a thickness α of the gas-barrier layer means a thickness of the layer comprising the hydrolysate of the silicon alkoxide, the stratified silicate and the polyvinyl alcohol base resin each described above and polyethylene oxide and the other optional additives which are added if necessary.

A thickness of such gas-barrier layer shall not specifically be restricted, and taking the revelation of a gas-barrier property and the prevention of cracks produced in handling into consideration, it is usually 0.1 to 10 μm, particularly preferably 0.5 to 3 μm.

A thickness of the gas-barrier film means the whole thickness in a state in which laminated are the gas-barrier layer and the substrate layer each described above and the other layer such as a sealing layer and an anchor coating layer which are provided if necessary.

A thickness of such gas-barrier film shall not specifically be restricted and is usually 5 to 200 μm, particularly preferably 10 to 100 μm.

The equations (1) and (2) are equations for correcting the regions of the oxygen permeability achieved by the present invention based on a thickness of the specific gas-barrier layer and a thickness of the gas-barrier film by multiplying by factors according to a change in the respective thicknesses. That is, it is shown that in the equations described above, a thickness of the gas-barrier layer exerts an influence directly on an oxygen permeability of the resulting gas-barrier film and that the influence of the gas-barrier film further comprising layers such as a substrate layer, a sealing layer, an anchor coating layer and an adhesive layer is effective almost in the proportion described above.

In this connection, a publicly known gas-barrier film having a gas-barrier layer comprising a hydrolysate of silicon alkoxide, a stratified silicate and a polyvinyl alcohol base resin has an oxygen permeability of 3.2 $ml/m^2 \cdot days \cdot atm$ when the gas-barrier layer has a thickness of 0.4 μm and the gas-barrier film has a thickness of 54.4 μm.

This value shows a value exceeding an upper limit value of an oxygen permeability Q in the gas-barrier film which is calculated by the equation described above in the present invention, and it is understood from this that the gas-barrier film of the present invention shows a very high gas-barrier property which can not be achieved by a conventional gas-barrier film comprising the same components.

The oxygen permeability of the gas-barrier film described above is a value measured according to a JIS K7126 B method.

The oxygen permeability of the gas-barrier film after left standing in hot water of a temperature of 90° C. is measured by a method in which the above gas-barrier film is completely dipped in hot water of 90° C. in a constant temperature bath and taken out after 30 minutes pass and in which water on the surface of the above film is wiped off and the oxygen permeability described above is then measured.

Further, in the gas-barrier film of the present invention, a distance $d_{ND}$ between domains in a vertical direction to a film face in the gas-barrier layer which is measured by small angle X-ray scattering is preferably 6.8 nm or less in terms of maintaining further more a very excellent gas-barrier property under high humidity and an excellent gas-barrier property even after boiling treatment in hot water in the case of providing a sealing layer. It is more preferably 6.3 nm or less, further preferably 5.8 nm or less. Further, a ratio $d_{IP}/d_{ND}$ of a distance $d_{IP}$ between domains in a film in-plane direction in the gas-barrier layer which is measured by small angle X-ray scattering to $d_{ND}$ described above is preferably 1.0 or more, more preferably 1.1 or more. If the distance $d_{ND}$ between domains is 6.8 or less and $d_{IP}/d_{ND}$ is 1.0 or more, the very excellent gas-barrier property can be maintained even after boiling treatment in hot water in the case of providing a sealing layer, and therefore it is preferred.

In the present invention, the distances $d_{ND}$ and $d_{IP}$ between domains in the gas-barrier layer which are measured by small angle X-ray scattering are indices for showing a fine periodic structure (density fluctuation) of the gas-barrier layer, and they can be determined from the positions (scattering angle 2θ) of scattered peaks appearing in small angle X-ray scattering according to a Bragg equation (2dsin θ=λ, λ is a wavelength of an X-ray) (L. H. Sperling, "Polymeric Multicomponent Materials", J. Wiley & Sons, Inc., N.Y. (1997), pp. 326).

The distance $d_{IP}$ between domains in a film in-plane direction in the gas-barrier layer can be determined by small angle X-ray scattering in a permeation method obtained by injecting (through injection) an X-ray vertically to a film face. The distance $d_{ND}$ between domains in a vertical direction to a film face can be determined by small angle X-ray scattering in a permeation method obtained by injecting (edge injection) an X-ray parallel to a film face from an end face of the film.

Further, scattering from the thermoplastic resin film which is the substrate layer, a bottom of a central beam, air scattering and parasitic scattering in addition to scattering from the gas-barrier layer are included in a small angle X-ray scattering profile obtained by measuring the gas-barrier film of the present invention. Then, scattering from the substrate layer thermoplastic resin film, a bottom of a central beam, air scattering and parasitic scattering can be removed by measuring a small angle X-ray scattering profile of the substrate layer film used for the gas-barrier film of the present invention or a thermoplastic resin film of the same material having a thickness of the same level as those of the substrate layer on the same conditions and deducting it from the small angle X-ray scattering profile of the gas-barrier film of the present invention, whereby a scattering profile coming only from the gas-barrier layer can be obtained. The distance between domains can be obtained from a peak position in the small angle X-ray scattering profile of the gas-barrier layer obtained by the above method.

In the gas-barrier film of the present invention, observation of a cross section of the gas-barrier layer under FE-TEM (field emission type transmission electron microscope) results in finding that while a space between the layers of the stratified silicate in a film thickness direction is about 10 to 20 nm, a distance between domains which is determined by small angle X-ray scattering is smaller than 10 nm and stays in the same levels in both of a film thickness direction and an in-plane direction. Accordingly, the domain in the gas-barrier layer herein referred to is the hydrolysate of the silicon alkoxide, and the distance between the domains is considered to be related to the dispersion state of the hydrolysate of the silicon alkoxide and the dispersed particle diameter.

That is, it is considered, though the accurate reasons are unknown, that the domains of the silicon alkoxide hydrolysate are small and minute in a direction perpendicular to the film face and has a structure in which they are thinly spread in the film face, so that the excellent gas-barrier property is exhibited under a high humidity and even after boiled in hot water in the case of providing the sealing layer.

In the gas-barrier film of the present invention, the material of the substrate layer shall not specifically be restricted as long as it is a thermoplastic resin, and considering to use it for packaging, it has preferably a transparency. The thermoplastic resin described above includes polyolefin resins such as ethylene homopolymers, random or block copolymers of ethylene with at least one α-olefin such as propylene, 1-butene, 1-pentene, 1-hexene and 4-methyl-1-pentene, random or block copolymers of ethylene with at least one of vinyl acetate, acrylic acid, methacrylic acid, methyl acrylate and methyl methacrylate, propylene homopolymers, random or block copolymers of propylene with at least one a-olefin other than propylene such as 1-butene, 1-pentene, 1-hexene and 4-methyl-1-pentene, 1-butene homopolymers, ionomer resins and mixtures of the above polymers; hydrocarbon base resins such as petroleum resins and terpene resins; polyester base resins such as polyethylene terephthalate, polybutylene terephthalate and polyethylene naphthalate; polyamide base resins such as nylon 6, nylon 66, nylon 11, nylon 12, nylon 610, nylon 6/66, nylon 66/610 and nylon MXD; acryl base resins such as polymethyl acrylate; styrene, acrylonitrile base resins such as polystyrene, styrene-acrylonitrile copolymers, styrene-acrylonitrile-butadiene copolymers and polyacrylonitrile; vinyl alcohol base resins such as polyvinyl alcohol and ethylene-vinyl alcohol copolymers; polycarbonate resins; polyketone resins; polymethylene oxide resins; polysulfone resins; polyimide resins; and polyamideimide resins. They can be used in a mixture of two or more kinds thereof.

Among them, the polyolefin base resins, the polyester base resins, the polyamide base resins, the styrene, acrylonitrile base resins, the vinyl alcohol base resins and the polycarbonate resins which are excellent in a transparency, a mechanical strength and a packaging aptitude are preferred in industrial uses, and the polyolefin resins, the polyester base resins and the polyamide base resins are more preferred.

In the substrate layer comprising the above preferred thermoplastic resins, the oxygen permeability which shows an oxygen-barrier property thereof and which is measured at a humidity of 90% RH is 10 ml/m²·day·atm or more.

Publicly known processes can be used as a production process for the thermoplastic resin film described above without restrictions. To be specific, publicly known processes such as a solution casting method, a T die method, a tubular method and a calendar method can be used. Taking the mechanical physical properties into consideration, the thermoplastic resin film described above is preferably subjected to stretching treatment. Publicly known methods can be used as the stretching method without restrictions and include, for example, roll monoaxial stretching, rolling, sequential biaxial stretching, simultaneous biaxial stretching and tubular stretching. Among these stretching methods, sequential biaxial stretching and simultaneous biaxial stretching are preferred taking the thickness accuracy and the mechanical physical properties into consideration.

A thickness of the thermoplastic resin film shall not specifically be restricted and may suitably be selected taking the uses into consideration, and it is suitably selected from a range of 1 to 200 μm. In the above range, considering the stretching processability, the gas-barrier property and the bag-making processability, the thickness is preferably 5 to 100 μm, more preferably 10 to 50 μm.

Further, the thermoplastic resin film described above may be blended, if necessary, with publicly known additives such as an antistatic agent, a defogging agent, an antiblocking agent, a heat stabilizer, an antioxidant, a light stabilizer, a crystal nuclear agent, a sliding agent, a UV absorber and a surfactant for the purpose of providing a sliding property and an antiblocking property to such an extent that the effects of then present invention are not damaged.

The substrate layer comprising the thermoplastic resin film described above is preferably transparent considering that it is suitably used for packaging use, particularly as a gas-barrier film. To be specific, the haze value is preferably 15% or less, more preferably 10% or less.

In the gas-barrier film of the present invention, a polyvinyl alcohol base polymer and a derivative thereof are used as the polyvinyl alcohol base resin which is one structural component for the gas-barrier layer. Preferably used are, for example, polyvinyl alcohol having a saponification rate of 75 mole % or more, polyvinyl alcohol in which 40 mole % or more of the whole hydroxyl groups is acetalized, alcohol-soluble modified polyvinyl alcohol and copolymerized polyvinyl alcohol such as ethylene-vinyl alcohol copolymers having a vinyl alcohol unit of 60 mole % or more. Among them, polyvinyl alcohol having a saponification rate of 75 mole % or more is more preferably used because the resulting film has a good transparency and a good gas-barrier property under a high humidity.

A polymerization degree of the polyvinyl alcohol base resin described above is preferably 300 to 5000, more preferably 500 to 3500 taking the processability into consideration.

In the gas-barrier film of the present invention, the hydrolysate of the silicon alkoxide which is one structural component for the gas-barrier layer includes a product obtained by hydrolysis of a part or the whole part of the silicon alkoxide, a condensation polymer of the silicon alkoxide, a product obtained by hydrolysis of a part or the whole part of an alkoxy group of the above condensation polymer and various mixtures thereof The silicon alkoxide described above shall not specifically be restricted as long as the hydrolysate can be formed. To be specific, it includes silicon alkoxides which can form hydrolysates such as tetramethoxysilane, tetraethoxysilane, methyltrimethoxysilane, ethyltrimethoxysilane, propyltrimethoxysilane, isopropyltimethoxysilane, butyltrimethoxysilane, glycidoxymethyltrimethoxysilane, 2-glycidoxyethyl-trimethoxysilane, 3-glycidoxypropyltrimethoxysilane, 3-glycidoxypropyltributoxysilane, (3,4-epoxycyclohexy)-methyltripropoxysilane, 2-(3,4-epoxycyclohexy)ethyl-trimethoxysilane, 3-(3,4-epoxycyclohexy)propyltrimethoxysilane, aminomethyltriethoxysilane, 2-aminoethyltrimethoxysilane, 1-aminoethyltrimethoxysilane, 3-aminopropyltrimethoxysilane, 3-aminopropyltriethoxysilane, N-aminomethylaminomethyl-trimethoxysilane, N-aminomethyl-3-aminopropyltrimethoxy-silane, N-(2-aminoethyl)-3-aminopropylmethyldimethoxysilane, vinyltrimethoxysilane, vinyltriacetoxysilane and N-β-(N-vinylbenzylaminoethyl)-γ-aminopropyltrimethoxysilane.

The condensation polymer of the silicon alkoxide and the product obtained by hydrolysis of a part or the whole part of an alkoxy group of the above condensation polymer include products formed as a result of condensation polymerization reaction by dewater and/or dealcohol which takes place together with the hydrolysis of the silicon alkoxide.

In the gas-barrier layer described above, it is preferred for exhibiting the excellent gas-barrier property that the hydrolysate of the silicon alkoxide is allowed to be present so that an amount of silicon originating in the silicon alkoxide is 90 to 500 parts by weight, preferably 100 to 350 parts by weight and more preferably 100 to 250 parts by weight in terms of $SiO_2$ per 100 parts by weight of the polyvinyl alcohol base resin.

In the gas-barrier film of the present invention, publicly known compounds are used as the stratified silicate which is one structural component for the gas-barrier layer without restrictions. They include, for example, montmorillonite, beidellite, nontronite, saponite, hectorite, stevensite, organic bentonite, kaolinite, dickite, nakhlite, halloysite, chrysotile, lizardite, antigorite, pecoraite, nepoaito, greenalite, caryopilite, amesite, A1-lizardite, bacherin, burindorianite, kerianite, kuronstedaito, pyrophyllite, talc, keroraito, williamsite, pemeraito, minnesotaite, mica, muscovige, phengite, illite, sericite, glauconite, celadonite, tobelite, palagonite, phlogopite, biotite, chlorite and vermiculite. A large part of them is produced in the form of natural minerals but may be produced by a chemical synthetic method.

The gas-barrier film obtained using montmorillonite out of them is excellent in a gas-barrier property and suited.

In the gas-barrier layer described above, it is preferred for exhibiting the excellent gas-barrier property that the stratified silicate is allowed to be present in an amount of 10 to 150 parts by weight, preferably 20 to 100 parts by weight 100 parts by weight of the polyvinyl alcohol base resin.

Further, in the gas-barrier layer described above, it is preferred for exhibiting the excellent gas-barrier property that a weight ratio (stratified silicate/silicon amount originating in silicon alkoxide) of the stratified silicate to a silicon amount (in terms of $SiO_2$) originating in the silicon alkoxide is 0.01 to 1, preferably 0.1 to 1.

In the gas-barrier film of the present invention, the components of the gas-barrier layer shall not specifically be restricted as long as they comprise the hydrolysate of the silicon alkoxide, the stratified silicate and the polyvinyl alcohol base resin, but in order to prevent cracks from being produced in forming the gas-barrier layer as well as in deforming the film in using, polyethylene oxide in addition to the components described above is preferably blended. The above polyethylene oxide having a higher average molecular weight is more effective, and used is the compound having an average molecular weight of preferably 100,000 or more, more preferably 500,000 or more and further preferably 2,000,000 or more.

The molecular end of the above polyethylene oxide may be a hydroxyl group or chemically modified and shall by no means be restricted, and the compound having hydroxyl groups at both ends is preferably used.

The polyethylene oxide described above is blended preferably in a proportion of 0.1 to 5 parts by weight, preferably 0.5 to 2 parts by weight 100 parts by weight of the polyvinyl alcohol base resin.

Further, the other components may be blended as a component for the gas-barrier layer constituting the gas-barrier film of the present invention as long as the effects of the present invention are not damaged.

They include, for example, a urethane base cross-linking agent, an isocyanate base cross-linking agent, an epoxy base cross-linking agent, a coupling agent such as a silane base coupling agent and a titanium base coupling agent, a water-soluble anchor coating agent such as water-based isocyanate, a water-based polyurethane resin, polyethyleneimine and a water-based epoxy ester, an aluminum base organic compound and a zirconium base organic compound.

The gas-barrier film of the present invention showing a very high gas-barrier property can suitably be obtained by forming the gas-barrier layer comprising the hydrolysate of the silicon alkoxide, the stratified silicate and the polyvinyl alcohol base resin on the substrate layer by the following method.

The gas-barrier film of the present invention can be obtained by coating on a substrate film, a gas-barrier coating agent comprising an aqueous solution obtained by hydrolyzing the silicon alkoxide in the presence of the stratified silicate dispersed in an aqueous solution of the polyvinyl alcohol base resin in which pH is controlled to 1 to 5, preferably 2 to 4.

In a production process for the gas-barrier film described above, to describe a suitable method for preparing the gas-barrier coating agent in details, an aqueous solution of the polyvinyl alcohol base resin in which the stratified silicate is dispersed in advance is first finely dispersed by means of a publicly known finely dispersing apparatus, for example, a supersonic disperser, a bead mill, a ball mill, a roll mill, a homomixer, a ultramixer, a disperse mixer, a feed-through type high pressure dispersing apparatus, a collision type high pressure dispersing apparatus, a perforated type high pressure dispersing apparatus, a damatori type high pressure dispersing apparatus, a (collision+feed-through) type high pressure dispersing apparatus and a ultrahigh pressure homogenizer.

Among the publicly known finely dispersing apparatuses described above, the homomixer, the ultramixer, the disperse mixer, the feed-through type high pressure dispersing apparatus, the collision type high pressure dispersing apparatus, the perforated type high pressure dispersing apparatus, the damatori type high pressure dispersing apparatus, the (collision+feed-through) type high pressure dispersing apparatus and the ultrahigh pressure homogenizer are particularly preferred for allowing the stratified silicate to stay in a good dispersion state and controlling Rg described above in the gas-barrier layer of the resulting gas-barrier film to 2.4 μm or less.

Montmorillonite is preferably used as the stratified silicate in order to control the distance $d_{ND}$ between domains in a vertical direction to the film face in the gas-barrier layer of the resulting gas-barrier film to 6.8 nm or less.

A water/lower alcohol mixed solvent is suitably used as a solvent for preparing the aqueous solution described above. Alcohol having 1 to 3 carbon atoms, to be specific, methanol, ethanol, n-propyl alcohol or isopropyl alcohol is suited as the lower alcohol described above.

A mixed proportion of water/lower alcohol described above is suitably selected from a range of 99/1 to 20/80 in term of a weight ratio.

A mixed amount of the polyvinyl alcohol base resin and the silicon alkoxide may suitably be determined so that a concentration of the polyvinyl alcohol base resin in the aqueous solution described above is 0.1 to 20%, and a mixed amount of the polyvinyl alcohol base resin and the silicon alkoxide may more preferably be adopted so that a concentration of the polyvinyl alcohol base resin based on the solvent falls a range of 1 to 10%.

In a method for controlling a pH of the aqueous solution of the polyvinyl alcohol base resin in which the stratified silicate described above is dispersed to the range described above, a method for protonating an exchangeable ion in the stratified silicate is effective for allowing the silicon alkoxide and/or the hydrolysate of the silicon alkoxide to be present between the layers in the stratified silicate in a high concentration and sufficiently expanding a space between the layers in the stratified silicate, and it is suitably adopted in the present invention. Ion exchange by a cation exchange resin and an ion exchange membrane is suited as the above protonation.

Protonation using a cation exchange resin includes, for example, an embodiment in which a solution containing stratified silicate is brought into contact with a cation exchange resin such as a polystyrene•sulfonic acid type strong acid ion exchange resin.

Protonation using an ion exchange membrane includes a method in which cation exchange membranes and anion exchange membranes having preferably a loose structure are alternately disposed between a cathode and an anode to constitute an electrodialysis bath comprising a cathode chamber having a cathode, an anode chamber having an anode and plural partitioned chambers provided therebetween and in which electrodialysis is carried out while feeding a solution containing stratified silicate to the chamber having an anion exchange membrane at an anode side and a cation exchange membrane at a cathode side and feeding an acid to the chamber adjacent to the above chamber and a method in which cation exchange membranes and bipolar membranes are alternately disposed between a cathode and an anode to constitute an electrodialysis bath comprising a cathode chamber having a cathode, an anode chamber having an anode and plural partitioned chambers provided therebetween and in which electrodialysis is carried out while feeding a solution containing stratified silicate to the chamber having a bipolar membrane at an anode side and a cation exchange membrane at a cathode side and feeding an electrolytic solution which is preferably a diluted alkaline aqueous solution to the chamber adjacent to the above chamber.

Then, the silicon alkoxide is added to the aqueous solution of the polyvinyl alcohol base resin in which pH is controlled to the range described above and in which the stratified silicate is dispersed, and hydrolysis is carried out in the presence of such dispersed stratified silicate.

The hydrolysis of the silicon alkoxide in the aqueous solution of the polyvinyl alcohol base resin containing the stratified silicate dispersed therein is carried out in the presence of a hydrolytic catalyst while controlling a pH of the aqueous solution described above to 1 to 5, preferably 2 to 4. When an exchangeable ion is protonated by ion exchange by a cation exchange resin and an ion exchange membrane to control the pH to the range described above, the above protonated stratified silicate itself can play as well a role of a hydrolytic catalyst, and therefore it is possible to hydrolyze the silicon alkoxide even when removing the cation exchange resin out of the system by filtering before hydrolyzing the silicon alkoxide.

The hydrolytic catalyst described above includes inorganic acids such as hydrochloric acid, nitric acid, sulfuric acid and phosphoric acid, organic acids such as organic phosphoric acid, formic acid, acetic acid, acetic anhydride, chloroacetic acid, propionic acid, butyric acid, valeric acid, oxalic acid, malonic acid, succinic acid, glutaric acid, adipic acid, glycolic acid, lactic acid, malic acid, tartaric acid, citric acid, gluconic acid, mucic acid, acrylic acid, methacrylic acid, glutaconic acid, crotonic acid, maleic acid, fumaric acid, itaconic acid, benzoic acid, phthalic acid, isophthalic acid, terephthalic acid, salicylic acid, cinnamic acid, uric acid, barbituric acid and p-toluenesulfonic acid and acid cation exchange resins.

Among them, the acid cation exchange resins are suited considering an easiness in controlling the pH, a simplicity in catalyst removing treatment and a transparency of the resulting gas-barrier layer.

In the hydrolysis described above, time therefor is one factor for determining the degree of the hydrolysis, and it is 1 to 24 hours, preferably 2 to 18 hours and more preferably 2 to 12 hours at a room temperature after controlling the pH to the range described above.

In the gas-barrier film of the present invention, polyethylene oxide which is added, if necessary, to the gas-barrier layer may be added everywhere in the production step described above. For example, after dispersing the stratified silicate, it may be added before hydrolyzing the silicon alkoxide or may be added after hydrolyzing the silicon alkoxide.

The proportions of the respective components in the production process described above are determined so that they become the proportions shown in the gas-barrier layer.

In the production process described above, considering the stability of the gas-barrier coating agent, coloring of the resulting gas-barrier layer and the revelation of the good gas-barrier property under a high humidity, the hydrolytic catalyst used for controlling the pH excluding the protonated stratified silicate is suitably removed out of the system before or after hydrolyzing the silicon alkoxide.

In the present invention, a method for removing the hydrolytic catalyst excluding the protonated stratified silicate before or after hydrolyzing the silicon alkoxide shall not specifically be restricted.

For example, in the case of the ion exchange resin, it can be removed by a physical method such as filtration. In the case of the inorganic acid and the organic acid, preferably used is a method in which an anionic component originating in the above inorganic acid and the above organic acid is ion-exchanged to a hydroxyl group by means of a hydroxyl group-ionized basic anion exchange resin to remove it out of the system by filtration.

In the present invention, the hydrolysis of the silicon alkoxide is preferably carried out until the liquid phases in which phase separation is caused become homogeneous. In this case, the state may be a partially hydrolyzed state, a completely hydrolyzed state or a state in which polycondensation reaction between silicon alkoxides themselves proceeds.

The gas-barrier coating agent described above is preferably controlled in pH finally in a range of 1 to 5 in terms of preventing the gas-barrier coating agent from being gelatinized, preventing cracks after forming the gas-barrier layer and exhibiting the good gas-barrier property under a high humidity.

In the production process for the gas-barrier film of the present invention, the gas-barrier layer and the substrate layer are laminated by the method described above in which the gas-barrier coating agent is coated on the substrate layer and dried.

In respect to timing for coating the gas-barrier coating agent described above on the substrate layer, the coating agent can be coated from a point of time when the hydrolysis of the silicon alkoxide proceeds and the liquid phases in which phase separation is caused become homogeneous. Further, considering the production of cracks in the resulting gas-barrier layer and a reduction in the gas-barrier property, the gas-barrier coating agent described above is preferably coated before a change in a quality thereof is brought about.

In the present invention, a method for coating the gas-barrier coating agent described above shall not specifically be restricted, and a solution or solvent dispersion coating method by which a thin film can be coated at a high speed is preferred. To specifically give the examples of these coating methods, suited is a method in which the gas-barrier coating agent is coated on the surface of the thermoplastic resin film by roll coating, reverse roll coating, gravure coating, spray coating, kiss coating, die coating, rod coating, bar coating, chamber doctor-jointly used gravure coating and curtain coating.

In the present invention, publicly known drying methods can be used as a method for drying the gas-barrier coating agent on the substrate layer without specific restrictions. To be specific, they include at least one of a hot roll contact method, a hot medium (air, oil and the like) contact method, an infrared heating method and a micro wave heating method. Among them, a hot air contact method and an infrared heating method are preferred considering the finishing such as the film appearance and the drying efficiency.

The drying conditions of the gas-barrier coating agent described above shall not specifically be restricted, and considering the revelation of the gas-barrier property and the drying efficiency, a temperature falling in a range of 60° C. or higher and lower than a melting point of the substrate is particularly preferably adopted. The drying temperature described above is more preferably 80° C. or higher, particularly preferably 90° C. or higher. Further, a temperature which is lower by 10° C. than a melting point of the substrate is more preferred, and a temperature which is lower by 15° C. is particularly preferred.

The drying time described above is preferably 5 seconds to 10 minutes, more preferably 10 seconds to 5 minutes taking the barrier property and the drying efficiency into consideration.

Irradiation with a high energy ray such as a UV ray, an X ray and an electron beam may be carried out, if necessary, before and after the drying described above. Further, considering further improvement in the gas-barrier property under a high humidity, the gas-barrier layer may be subjected directly to surface treatment such as corona discharge treatment and flame plasma treatment after the drying described above.

In the present invention, a method in which the gas-barrier coating agent described above is coated on the substrate layer and dried at the temperature described above to form the gas-barrier layer and in which it is then further subjected to aging treatment is effective for obtaining the gas-barrier film providing more excellent gas-barrier property.

The aging treatment described above is effective for an improvement in the gas-barrier property of the resulting gas-barrier film, particularly an improvement in the gas-barrier property under such a high humidity as exceeding 90% RH and an exhibition in the excellent gas-barrier property after boiling treatment in hot water. The conditions of the aging treatment may suitably be determined and shall not specifically be restricted, and it is determined in a condition range in which damages such as wrinkles and sagging in the substrate layer are not caused by aging.

In the present invention, the film comprising the gas-barrier layer described above formed on the substrate layer is subjected to the aging treatment under the atmosphere of a temperature of 30 to 80° C. and a relative humidity of 30 to 100% RH. The aging treatment carried out under the atmosphere of a relative humidity of 30 to 100% RH is preferred since it is effective for the excellent gas-barrier property after boiling treatment in hot water. If the relative humidity is less than 30% RH, the resulting gas-barrier film subjected to the aging treatment is reduced in a gas-barrier property after boiling treatment in hot water in the embodiment in which the sealing layer is laminated on the gas-barrier layer.

The present effect is estimated to be revealed because of the reasons that the hydrolysis of an alkoxyl group of the silicon alkoxide remaining in the gas-barrier layer of the gas-barrier film used in the present invention, polycondensation reaction following it and hydrogen bonding with the polyvinyl alcohol base resin are accelerated by carrying out the aging treatment under the atmosphere of a relative humidity of 30% RH or more and that a free volume in the coating layers is reduced.

The temperature in the aging treatment falls in a range of 30 to 80° C. If it is lower than 30° C., time required for aging is extended. On the other hand, if it exceeds 80° C., a secondary processing aptitude in printing and bag making is reduced by a deformation and a moisture absorption in the substrate layer itself.

The specific aging treatment conditions may be determined in a range in which damages such as wrinkles and sagging in the substrate layer are not caused by aging, which is selected from the condition range of the aging treatment described above. Considering that the very excellent gas-barrier property is shown even under a high humidity and that the gas-barrier property is excellent after boiling, the aging treatment is preferably carried out under the atmosphere of a temperature of 30 to 80° C. and a relative humidity of 30 to 100% RH, and the aging treatment is more preferably carried out under the atmosphere of a temperature of 40 to 80° C. and a relative humidity of 40 to 90% RH. For example, when the thermoplastic resin film is a biaxially oriented polypropylene film, the aging treatment is more preferably carried out under the atmosphere of a temperature of 40 to 50° C. and a relative humidity of 40 to 100% RH, which are selected from a range of a temperature of 30 to 50° C. and a relative humidity of 30 to 100% RH. The temperature and the relative humidity are preferably set up higher as long as they fall in a condition range in which damages such as wrinkles and sagging in the substrate layer are not caused, because the number of days required for aging can be reduced.

The number of days required for aging may suitably be determined, and taking the productivity into consideration, the temperature and the relative humidity described above may be set up so that it falls in a range of, for example, 1 to 10 days.

A method for carrying out the aging treatment on the conditions described above shall not specifically be restricted. To give the example of the suited method, capable of being given is a method in which the film obtained by coating the gas-barrier coating agent on the substrate layer described above and drying it is subjected to the aging treatment in a constant temperature and constant humidity chamber in which a temperature and a humidity are set up. Further, there may be used a method in which when rolling the film in a roll form, a rolling tension is lowered to provide a space between the gas-barrier films and in which the film is then subjected to the aging treatment in a constant temperature and constant humidity chamber and a method in which when rolling the film in a roll form, steam is sprayed on the above gas-barrier layer to subject the film to the aging treatment.

The gas-barrier film characterized by that an oxygen permeability (Q; ml/m$^2$·day·atm) measured at a temperature of 23° C., a humidity of 90% RH at a substrate layer side and a humidity of 90% RH at a sealing layer side satisfies the following equation (3) can be obtained as well by carrying out the aging treatment described above, and such embodiment is more preferred in the present invention:

$$Q \leq 2.0/(\gamma/90+\alpha) \quad (3)$$

wherein α represents a thickness (μm) of the gas-barrier layer, and γ represents a thickness (μm) of the gas-barrier film.

In the gas-barrier film described above, the gas-barrier film which is a laminate comprising a sealing layer comprising a thermoplastic resin having a lower melting point than that of the thermoplastic resin constituting the substrate layer on a face opposite to a face on which the substrate layer in the gas-barrier layer is laminated and in which an oxygen permeability (Q'; ml/m$^2$·day·atm) measured at a temperature of 23° C., a humidity of 90% RH at a substrate layer side and a humidity of 90% RH at a sealing layer side after left standing in hot water having a temperature of 90° C. satisfies the following equation (4) can be obtained as well, and such embodiment is most preferred in the present invention:

$$Q' \leq 60/(\gamma/90+\alpha) \quad (4)$$

wherein α represents a thickness (μm) of the gas-barrier layer, and γ represents a thickness (μm) of the gas-barrier film.

In the present invention, the surface of the substrate layer laminated thereon with the gas-barrier layer is suitably subjected to surface treatment in order to enhance more an adhesive property between the substrate layer and the gas-barrier layer and improve more a gas-barrier property and a durability of the resulting gas-barrier film.

Publicly known surface treatments can be used as the above surface treatment without any restrictions. Capable of being given are, for example, surface treatments such as atmospheric corona discharge treatment, nitrogen-atmospheric corona discharge treatment, carbon dioxide-atmospheric corona discharge treatment, flame plasma treatment, UV treatment, ozone treatment, electron beam treatment and plasma treatment by excited inert gas. These surface treatments may be used in combination.

Considering to raise more the adhesive property between the substrate layer and the gas-barrier layer described above, a method in which an anchor coating layer is provided between the above layers is preferably adopted.

Publicly known compounds can be used as an anchor coating agent used for the anchor coating layer described above without specific restrictions. They include, for example, anchor coating agents of an isocyanate base, a polyurethane base, a polyester base, a polyethyleneimine base, a polybutadiene base, a polyolefin base, an alkyl titanate base.

Further, in the gas-barrier film of the present invention, a sealant layer of polyolefin, an ethylene-vinyl acetate copolymer and an ethylene-methacrylate copolymer which are commercially available may be laminated on the outside of the gas-barrier layer obtained by the method described above for the purpose of providing the heat sealing property and the hot water resistance.

EFFECTS OF THE INVENTION

As understood from the above explanations, it is possible according to the present invention to provide a gas-barrier film having a very high gas-barrier property which has so far been unable to be achieved in a gas-barrier film comprising a gas-barrier layer comprising a polyvinyl alcohol base resin, a hydrolysate of silicon alkoxide and a stratified silicate.

Further, the very high gas-barrier property described above can be maintained even after left standing in hot water in an embodiment in which a sealing layer is laminated on the gas-barrier layer, and the gas-barrier layer comprising the polyvinyl alcohol base resin has made it possible to achieve characteristics comparable with those in a polyvinyl vinylidene-coated film which has so far been used as a gas-barrier layer.

INDUSTRIAL APPLICABILITY

Accordingly, the gas-barrier film of the present invention is useful for wide uses as a gas-barrier film for dried foods such as snacks, intermediate moisture foods such as foods of a delicate flavor, green noodles and cakes and high moisture foods such as foods boiled down in soy, daily dishes, pickles, boiled fish pastes, hams and sausages.

BEST MODE FOR CARRYING OUT THE INVENTION

The present invention shall be explained below with reference to examples and comparative examples, but the present invention shall not be restricted to these examples.

The film physical properties in the following examples and comparative examples were measured by the following methods.

(1) Oxygen Permeability Q

Measured by means of an oxygen permeability measuring apparatus (OX-TRAN100, manufactured by Mocon Co., Ltd.) according to a JIS K7126 B method. The measuring conditions were set to a temperature of 23° C., a humidity of 90% RH at a substrate layer side and a humidity of 90% RH at a gas-barrier layer side. The humidity was controlled by means of a precision humidity controlling system RH-3S type manufactured by Hitachi Instrument Co., Ltd.

(2) Oxygen Permeability Q' After Hot Water Treatment

A bag having a size of 15 cm×15 cm was prepared from a gas-barrier film laminated thereon with a sealing layer comprising a gas-barrier layer provided on the inner face thereof, and 200 ml of water was put therein. This bag was dipped in hot water of 90° C. for 30 minutes and subjected to hot water treatment. After finishing the hot water treatment, the content was immediately thrown away, and the bag was washed with water and then set into the oxygen permeability measuring apparatus within 10 minutes. The oxygen permeability was measured by means of the oxygen permeability measuring apparatus (OX-TRAN100, manufactured by Mocon Co., Ltd.) according to the JIS K7126 B method. The measuring conditions were set to a gas flow amount of 20 ml/minute, a temperature of 23° C., a humidity of 90% RH at a substrate layer side and a humidity of 90% RH at a sealing layer side. The humidity was controlled by means of the precision humidity controlling system RH-3S type manufactured by Hitachi Instrument Co., Ltd. The gas-barrier film subjected to the hot water treatment was set therein to start oxygen permeability measurement after 10 minutes, and the oxygen permeability after one hour since starting the measurement was evaluated as the oxygen permeability Q' after the hot water treatment.

(3) Coating

Coating and drying were carried out on a thermoplastic resin film by means of a test coater manufactured by Akatsuki Machinery Co., Ltd. to form a gas-barrier layer.

Coating system: gravure coating system

Drying method: guide roll arch type hot air jet nozzle blowing system (4) Radius Rg of Gyration of Scattering Matter by Light Scattering Vv scattering was measured by the following method by means of a light scattering measuring apparatus DYNA-100 manufactured by Ohtsuka Electron Co., Ltd.

Light source: 5 mW He—Ne laser

Angle range: 1.5 to 30°

Step angle: 0.5°

ND filter: 0.1

Detector: photomultiplier for photon counting

In this case, a lateral direction (vertical direction to a machine direction) of the film was agreed with a polarizing direction of a polarizer and an analyzer of the light scattering measuring apparatus, and a laser beam was injected vertically to the film to measure the scattering strength.

A straight line area at a small angle side of a Guinier plot was approximated by a least square method using Guinier plot calculation which was a software attached to the apparatus described above to determine the radius Rg of gyration of a scattering matter from a gradient thereof. This was repeated at optional 15 points in the gas-barrier film to determine an average value from them.

(5) FE-TEM Observation and EDS Analysis

The film was covered with an epoxy resin and fixed, and a ultra-thin section having a thickness of 80 nm was cut out from the cross section of the gas-barrier layer by means of a ultramicrotome. The ultra-thin section thus obtained was observed under FE-TEM (field emission type transmission electron microscope Tecnai F20 manufactured by Philips Electron Optics Co., Ltd.) having an STEM (scanning transmission electron microscope) function. Further, a dispersion concentration of elements with C, O, Al and Si set as target elements and element mapping showing a dispersion concentration of the elements were determined by means of EDS (energy dispersion type X-ray analytical apparatus) installed in the FE-TEM.

(6) Distances $d_{IP}$ and $d_{ND}$ Between Domains Measured by Small Angle X-ray Scattering A small angle X-ray scattering measuring device was installed in an X-ray diffractometer JDX-3500 manufactured by Nippon Electron Co., Ltd. to measure transmission method small angle X-ray scattering by the following method.

Target: cupper (Cu—K α ray)

X-ray tube voltage-tube current: 40 kV-400 mA

Monochromaticity: Ni filter

First slit: 0.30 mm×12 mm

Second slit: 0.20 mm×12 mm

Third slit: used

Fourth slit: 0.20 mm×20 mm

Fifth slit: 0.15 mm×20 mm

Detector: scintillation counter

X-ray incident method: transmission method (sample fixed 0°)

Measured angle range: 2θ=0.3 to 5.0°

Step angle: 0.010°

Counting time: 20 seconds

In respect to measurement of $d_{IP}$, the gas-barrier films in which a direction was put in order were cut to 15 mm×25 mm and superposed in a thickness of 0.8 to 1.0 mm (40 sheets in this case), and an X-ray was injected (through injection) vertically to the film face to measure small angle X-ray scattering $I_{IP}$. Further, the substrate layers or the thermoplastic resin films (having the same thickness and the same quality as those of the substrate layer) were superposed in the same number of sheets (40 sheets in this case) in the same manner to measure small angle X-ray scattering $I_{IP0}$. The distance $d_{IP}$ between the domains was determined from a peak position in a through injection scattering profile of the gas-barrier layer obtained by deducting $I_{IP0}$ from $I_{IP}$. This was repeated at optional 5 points to determine an average value from them.

In respect to measurement of $d_{ND}$, the gas-barrier films in which a direction was put in order were cut to 15 mm×25 mm and superposed in a thickness of 4 to 5 mm (200 sheets in this case), and the films were interposed by means of a metal-made jig and flatly fixed. They were installed in a small angle X-ray scattering apparatus so that the film face (major edge of the film sample) was parallel to the slit of the apparatus, and an X-ray was injected (edge injection) parallel to the film face (minor edge of the film sample) to measure small angle X-ray scattering $I_{ND}$. Further, the substrate layers or the thermoplastic resin films (having the same thickness and the same quality as those of the substrate layer) were superposed in the same number of sheets (200 sheets in this case) in the same manner to measure small angle X-ray scattering $I_{ND0}$. The distance $d_{ND}$ between the domains was determined from a peak position in an edge injection scattering profile of the gas-barrier layer obtained by deducting (thickness of the substrate layer/thickness of the gas-barrier film)×$I_{IP0}$ from $I_{IP}$. This was repeated at optional 5 points to determine an average value from them.

EXAMPLE 1

Polyvinyl alcohol having an average polymerization degree of 1700 and a saponification rate of 98% or more was dissolved in a mixed solvent of 70 parts by weight of water and 30 parts by weight of ethanol at 70° C. so that the concentration was 6.7% by weight to obtain a 6.7 weight % solution (abbreviated as a liquid A) of polyvinyl alcohol.

Montmorillonite (Kunipia G, manufactured by Kunimine Ind. Co., Ltd.) as a stratified silicate was added to a mixed solvent of 70 parts by weight of water and 30 parts by weight of ethanol at 70° C. so that the concentration was 3.3% by weight and dispersed while stirring at 60° C. to obtain a 3.3 weight % dispersion (abbreviated as a liquid B) of the stratified silicate.

A solution obtained by mixing the liquid A and the liquid B each described above in a weight proportion of 1/1 was subjected to fine dispersion treatment by means of a collision type high pressure dispersing apparatus (HJP-25030, manufactured by Sugino Machine Co., Ltd.) to obtain a fine dispersion containing 3.3 weight % of polyvinyl alcohol and 1.7 weight % of the stratified silicate. A hydrogen-ionized strong acid ion exchange resin having a bead form was added to the above fine dispersion to control a pH to 4.2.

Tetraethoxysilane was added to the above pH-controlled fine dispersion in an amount of 150 parts by weight in terms of a silicon amount (reduced to $SiO_2$) originating in the silicon alkoxide per 100 parts by weight of the polyvinyl alcohol, and the dispersion was stirred at a room temperature for about 12 hours to hydrolyze tetraethoxysilane. Then, the ion exchange resin and foreign matters such as dusts were removed by filtration to obtain a gas-barrier coating agent. The gas-barrier coating agent thus obtained had a pH of 3.8.

A weight part ratio of the polyvinyl alcohol/the stratified silicate contained in the above gas-barrier coating agent was 100/50, and a weight ratio (stratified silicate/silicon amount originating in the silicon alkoxide) of the stratified silicate to a silicon amount (reduced to $SiO_2$) originating in the silicon alkoxide was 0.33.

An anchor coating agent (manufactured by Toyo Morton Co., Ltd., AD335AE/CAT10L=10 parts by weight/1.4 part by weight was adjusted by a mixed solvent of ethyl acetate/toluene=1 part by weight/1 part by weight so that nonvolatile matters accounted for 6% by weight) was coated on a corona discharge-treated face of a biaxially oriented polypropylene film having a thickness of 20 μm which was subjected to corona discharge treatment so that a dry weight of the anchor coating layer was 0.3 g/m², and it was dried at 100° C. by hot air to obtain the biaxially oriented polypropylene film on which the anchor coating agent was coated.

The gas-barrier coating agent obtained above was coated on the anchor coating layer of the above biaxially oriented polypropylene film on which the anchor coating agent was coated so that a thickness of the gas-barrier layer after drying was 2.0 μm, and it was dried at 120° C. by hot air. Then, the coated film thus obtained was subjected to aging treatment at 40° C. and a relative humidity of 80% RH for 4 days to obtain a gas-barrier film. An FE-TEM photograph of a gas-barrier layer cross section of the gas-barrier film thus obtained was shown in FIG. 1, and the result of EDS analysis thereof was shown in FIG. 2. It was confirmed that the silicon alkoxide and/or the hydrolysate thereof were present between the layers of the stratified silicate.

The measurement results of the gas-barrier film thus obtained were shown in Table 1.

EXAMPLE 2

A gas-barrier agent was obtained in the same manner as in Example 1, except that in Example 1, tetraethoxysilane was added in an amount of 127 parts by weight in terms of a silicon amount (reduced to $SiO_2$) originating in the silicon alkoxide per 100 parts by weight of the polyvinyl alcohol. A weight part ratio of the polyvinyl alcohol/the stratified silicate contained in the above gas-barrier coating agent was 100/50, and a weight ratio (stratified silicate/silicon amount originating in the silicon alkoxide) of the stratified silicate to a silicon amount (reduced to $SiO_2$) originating in the silicon alkoxide was 0.39. A coated film was obtained in the same manner as in Example 1, and then the above coated film was subjected to aging treatment at 40° C. and a relative humidity of 80% RH for 4 days to obtain a gas-barrier film. A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 3

A gas-barrier agent was obtained in the same manner as in Example 1, except that in Example 1, tetraethoxysilane was added in an amount of 100 parts by weight in terms of a silicon amount (reduced to $SiO_2$) originating in the silicon alkoxide per 100 parts by weight of the polyvinyl alcohol.

A weight part ratio of the polyvinyl alcohol/the stratified silicate contained in the above gas-barrier coating agent was 100/50, and a weight ratio (stratified silicate/silicon amount originating in the silicon alkoxide) of the stratified silicate to a silicon amount (reduced to $SiO_2$) originating in the silicon alkoxide was 0.50.

A coated film was obtained in the same manner as in Example 1, and then the above coated film was subjected to aging treatment at 40° C. and a relative humidity of 80% RH for 4 days to obtain a gas-barrier film. A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 4

A gas-barrier agent was obtained in the same manner as in Example 1, except that in Example 1, the liquid A was mixed with the liquid B in a proportion of 2/1 and that tetraethoxysilane was added in an amount of 150 parts by weight in terms of a silicon amount (reduced to $SiO_2$) originating in the silicon alkoxide per 100 parts by weight of the polyvinyl alcohol. A weight part ratio of the polyvinyl alcohol/the stratified silicate contained in the above gas-barrier coating agent was 100/25, and a weight ratio (stratified silicate/silicon amount originating in the silicon alkoxide) of the stratified silicate to a silicon amount (reduced to $SiO_2$) originating in the silicon alkoxide was 0.16. A coated film was obtained in the same manner as in Example 1, and then the above coated film was subjected to aging treatment at 40° C. and a relative humidity of 80% RH for 4 days to obtain a gas-barrier film. A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 5

A gas-barrier agent was obtained in the same manner as in Example 1, except that in Example 1, the liquid A was mixed with the liquid B in a proportion of 1/1.7 and that tetraethoxysilane was added in an amount of 150 parts by weight in terms of a silicon amount (reduced to $SiO_2$) originating in the silicon alkoxide per 100 parts by weight of the polyvinyl alcohol.

A weight part ratio of the polyvinyl alcohol/the stratified silicate contained in the above gas-barrier coating agent was 100/83, and a weight ratio (stratified silicate/silicon amount originating in the silicon alkoxide) of the stratified silicate to a silicon amount (reduced to $SiO_2$) originating in the silicon alkoxide was 0.56.

A coated film was obtained in the same manner as in Example 1, and then the above coated film was subjected to aging treatment at 40° C. and a relative humidity of 80% RH for 4 days to obtain a gas-barrier film.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 6

A gas-barrier agent was obtained in the same manner as in Example 1, except that in Example 1, the liquid A was mixed with the liquid B in a proportion of 1/2.5 and that tetraethoxysilane was added in an amount of 150 parts by weight in terms of a silicon amount (reduced to $SiO_2$) originating in the silicon alkoxide per 100 parts by weight of the polyvinyl alcohol.

A weight part ratio of the polyvinyl alcohol/the stratified silicate contained in the above gas-barrier coating agent was 100/125, and a weight ratio (stratified silicate/silicon amount originating in the silicon alkoxide) of the stratified silicate to a silicon amount (reduced to $SiO_2$) originating in the silicon alkoxide was 0.84. A coated film was obtained in the same manner as in Example 1, and then the above coated film was subjected to aging treatment at 40° C. and a relative humidity of 80% RH for 4 days to obtain a gas-barrier film.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 7

A gas-barrier agent and a gas-barrier film were obtained in the same manner as in Example 1, except that one part by weight of polyethylene glycol having an average molecular weight of 4,000,000 per 100 parts by weight of the polyvinyl alcohol was added to the fine dispersion containing the polyvinyl alcohol and the stratified silicate prepared in Example 1.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 8

A gas-barrier agent was prepared in the same manner as in Example 1, except that one part by weight of polyethylene glycol having an average molecular weight of 4,000,000 per 100 parts by weight of the polyvinyl alcohol was added to the fine dispersion containing the polyvinyl alcohol and the stratified silicate prepared in Example 1 and that a prescribed amount of a hydrogen-ionized strong acid ion exchange resin was added thereto as 1N nitric acid in a prescribed amount and stirred at a room temperature for one hour to hydrolyze tetraethoxysilane. The above gas-barrier agent had a pH of 2.2.

The above gas-barrier agent was used to obtain a gas-barrier film in the same manner as in Example 1.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 9

A gas-barrier coating agent and a gas-barrier film were obtained in the same manner as in Example 1, except that 2 parts by weight of polyethylene glycol having an average molecular weight of 2,000,000 per 100 parts by weight of the polyvinyl alcohol was added to the fine dispersion containing the polyvinyl alcohol and the stratified silicate prepared in Example 1.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 10

A gas-barrier film was obtained in the same manner as in Example 1, except that the gas-barrier coating agent obtained in Example 7 was coated on an anchor coating layer of a biaxially oriented polypropylene film coated thereon with the same anchor coating agent as in Example 1 so that a thickness of the gas-barrier layer after drying was 2.0 μm, and it was dried at 100° C. by hot air.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 11

A gas-barrier film was obtained in the same manner as in Example 1, except that the gas-barrier coating agent obtained in Example 7 was coated on an anchor coating layer of a biaxially oriented polypropylene film coated thereon with the same anchor coating agent as in Example 1 so that a thickness of the gas-barrier layer after drying was 2.0 μm, and it was dried at 80° C. by hot air and subjected to aging treatment at 40° C. and a relative humidity of 80% RH for 7 days.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 12

A gas-barrier film was obtained in the same manner as in Example 1, except that the gas-barrier coating agent obtained in Example 7 was coated on an anchor coating layer of a biaxially oriented polypropylene film coated thereon with the same anchor coating agent as in Example 1 so that a thickness of the gas-barrier layer after drying was 2.0 μm, and it was dried at 100° C. by hot air and subjected to aging treatment at 23° C. and a relative humidity of 80% RH for 14 days.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 13

An anchor coating agent (manufactured by Toyo Morton Co., Ltd., AD335AE/CAT10L=10 parts by weight/1 part by weight was adjusted by a mixed solvent of ethyl acetate/toluene=1 part by weight/1 part by weight so that nonvolatile matters accounted for 6% by weight) was coated on a corona discharge-treated face of a biaxially oriented polyethylene terephthalate film having a thickness of 12 μm which was subjected to corona discharge treatment so that a dry weight of the anchor coating layer was 0.3 g/m², and it was dried at 100° C. by hot air to obtain a biaxially oriented polyethylene terephthalate film on which the anchor coating agent was coated.

The gas-barrier coating agent obtained in Example 7 was coated on the anchor coating layer of the biaxially oriented polyethylene terephthalate film on which the above anchor coating agent was coated so that a thickness of the gas-barrier layer after drying was 2.0 μm, and it was dried at 120° C. by hot air to obtain a coated film.

Then, the coated film thus obtained was subjected to aging treatment at 40° C. and a relative humidity of 80% RH for 4 days to obtain a gas-barrier film.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 14

An anchor coating agent (manufactured by Mitsui Takeda Chemical Co., Ltd., A3210/A3070=3 parts by weight/1 part by weight was adjusted by ethyl acetate so that nonvolatile matters accounted for 6% by weight) was coated on a corona discharge-treated face of a biaxially oriented nylon film having a thickness of 15 μm which was subjected to corona discharge treatment so that a dry weight of the anchor coating layer was 0.3 g/m², and it was dried at 100° C. by hot air to obtain a biaxially oriented nylon film on which the anchor coating agent was coated.

The gas-barrier coating agent obtained in Example 7 was coated on an anchor coating layer of the biaxially oriented nylon film on which the above anchor coating agent was coated so that a thickness of the gas-barrier layer after drying was 2.0 μm, and it was dried at 100° C. by hot air to obtain a coated film.

Then, the coated film thus obtained was subjected to aging treatment at 40° C. and a relative humidity of 80% RH for 4 days to obtain a gas-barrier film.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 15

A gas-barrier coating agent and a gas-barrier film were obtained in the same manner as in Example 1, except that a hydrogen-ionized strong acid ion exchange resin having a bead form was added to the fine dispersion containing the polyvinyl alcohol and the stratified silicate obtained in Example 1 to control a pH to 3.0 and that tetraethoxysilane was added to the above pH-controlled fine dispersion in an amount of 150 parts by weight in terms of a silicon amount (reduced to $SiO_2$) originating in the silicon alkoxide per 100 parts by weight of the polyvinyl alcohol and stirred at a room temperature for 2 hours to hydrolyze tetraethoxysilane. The gas-barrier coating agent thus obtained had a pH of 3.0.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 16

A gas-barrier coating agent and a gas-barrier film were obtained in the same manner as in Example 1, except that a hydrogen-ionized strong acid ion exchange resin having a bead form was added to the fine dispersion containing the polyvinyl alcohol and the stratified silicate obtained in Example 1 to control a pH to 3.0 and that tetraethoxysilane was added to the above pH-controlled fine dispersion in an amount of 150 parts by weight in terms of a silicon amount (reduced to $SiO_2$) originating in the silicon alkoxide per 100 parts by weight of the polyvinyl alcohol and stirred at a room temperature for 20 hours to hydrolyze tetraethoxysilane. The gas-barrier coating agent thus obtained had a pH of 3.0.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 17

A gas-barrier coating agent and a gas-barrier film were obtained in the same manner as in Example 15, except that a hydrogen-ionized strong acid ion exchange resin having a bead form was added to the fine dispersion containing the polyvinyl alcohol and the stratified silicate obtained in Example 15 to control a pH to 2.4. The gas-barrier coating agent thus obtained had a pH of 2.5.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 18

A gas-barrier coating agent and a gas-barrier film were obtained in the same manner as in Example 15, except that a hydrogen-ionized strong acid ion exchange resin having a bead form was added to the fine dispersion containing the polyvinyl alcohol and the stratified silicate obtained in Example 15 to control a pH to 2.4 and that one part by weight of polyethylene glycol having an average molecular weight of 4,000,000 per 100 parts by weight of the polyvinyl alcohol was added. The gas-barrier coating agent thus obtained had a pH of 2.5.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 19

A hydrogen-ionized strong acid ion exchange resin having a bead form was added to the fine dispersion containing the polyvinyl alcohol and the stratified silicate obtained in Example 1 to control a pH to 2.4, and one part by weight of polyethylene glycol having an average molecular weight of 4,000,000 per 100 parts by weight of the polyvinyl alcohol was added thereto. A gas-barrier coating agent was obtained in the same manner as in Example 1, except that tetraethoxysilane was added to the above fine dispersion in which a pH was controlled and to which the polyethylene glycol was added in an amount of 230 parts by weight in terms of a silicon amount (reduced to $SiO_2$) originating in the silicon alkoxide per 100 parts by weight of the polyvinyl alcohol and stirred at a room temperature for 2 hours to hydrolyze tetraethoxysilane. The gas-barrier coating agent thus obtained had a pH of 2.5.

A weight part ratio of the polyvinyl alcohol/the stratified silicate contained in the above gas-barrier coating agent was 100/50, and a weight ratio (stratified silicate/silicon amount originating in the silicon alkoxide) of the stratified silicate to a silicon amount (reduced to $SiO_2$) originating in the silicon alkoxide was 0.22.

The above gas-barrier coating agent was coated on an anchor coating layer of a biaxially oriented polypropylene film coated thereon with the same anchor coating agent as in Example 1 so that a thickness of the gas-barrier layer after drying was 2.0 µm, and it was dried at 100° C. by hot air. Then, the coated film thus obtained was subjected to aging treatment at 40° C. and a relative humidity of 80% RH for 4 days to obtain a gas-barrier film.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 20

A gas-barrier coating agent and a gas-barrier film were obtained in the same manner as in Example 19, except that in Example 19, tetraethoxysilane was added in an amount of 320 parts by weight in terms of a silicon amount (reduced to $SiO_2$) originating in the silicon alkoxide per 100 parts by weight of the polyvinyl alcohol.

A weight part ratio of the polyvinyl alcohol/the stratified silicate contained in the above gas-barrier coating agent was 100/50, and a weight ratio (stratified silicate/silicon amount originating in the silicon alkoxide) of the stratified silicate to a silicon amount (reduced to $SiO_2$) originating in the silicon alkoxide was 0.16. A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 21

A solution obtained by mixing the liquid A and the liquid B in a weight proportion of 2/1 in Example 1 was subjected to fine dispersion treatment by means of a collision type high pressure dispersing apparatus (HJP-25030, manufactured by Sugino Machine Co., Ltd.) to obtain a fine dispersion containing 4.4% by weight of the polyvinyl alcohol and 1.1% by weight of the stratified silicate. A hydrogen-ionized strong acid ion exchange resin having a bead form was added to the above fine dispersion to control a pH to 4.2, and one part by weight of polyethylene glycol having an average molecular weight of 4,000,000 per 100 parts by weight of the polyvinyl alcohol was added thereto. A gas-barrier agent was obtained in the same manner as in Example 1, except that tetraethoxysilane was added to the above fine dispersion in which a pH was controlled and to which the polyethylene glycol was added in an amount of 300 parts by weight in terms of a silicon amount (reduced to $SiO_2$) originating in the silicon alkoxide per 100 parts by weight of the polyvinyl alcohol and stirred at a room temperature for 2 hours to hydrolyze tetraethoxysilane. The gas-barrier coating agent thus obtained had a pH of 2.8.

A weight part ratio of the polyvinyl alcohol/the stratified silicate contained in the above gas-barrier coating agent was 100/25, and a weight ratio (stratified silicate/silicon amount originating in the silicon alkoxide) of the stratified silicate to a silicon amount (reduced to $SiO_2$) originating in the silicon alkoxide was 0.08.

The gas-barrier coating agent thus obtained was coated on an anchor coating layer of a biaxially oriented polypropylene film coated thereon with the same anchor coating agent as in Example 1 was coated so that a thickness of the gas-barrier layer after drying was 2.0 μm, and it was dried at 100° C. by hot air.

Then, the coated film thus obtained was subjected to aging treatment at 40° C. and a relative humidity of 80% RH for 4 days to obtain a gas-barrier film.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

EXAMPLE 22

A gas-barrier film was obtained in the same manner as in Example 19, except that the gas-barrier coating agent obtained in Example 19 was coated on an anchor coating layer of a biaxially oriented polypropylene film coated thereon with the same anchor coating agent as in Example 1 so that a thickness of the gas-barrier layer after drying was 1.0 μm.

A gas-barrier layer of the gas-barrier film thus obtained was analyzed by FE-TEM and EDS, and as a result thereof, it was confirmed that the silicon alkoxide and/or the hydrolysate thereof were present between the layers of the stratified silicate.

The measurement results of the gas-barrier film thus obtained were shown in Table 1.

COMPARATIVE EXAMPLE 1

A hydrogen-ionized strong acid ion exchange resin having a bead form and tetraethoxysilane were added to the liquid A prepared in Example 1 in an amount of 127 parts by weight in terms of a silicon amount (reduced to $SiO_2$) originating in the silicon alkoxide per 100 parts by weight of the polyvinyl alcohol and stirred at a room temperature until the hydrolysis of tetraethoxysilane proceeded to obtain the homogeneous phase. Then, the ion exchange resin and foreign matters such as dusts were removed by filtration to obtain a gas-barrier agent. The gas-barrier agent was a transparent liquid and had a pH of 4.2. The above gas-barrier agent was used to obtain a gas-barrier film in the same manner as in Example 1.

The measurement results of the gas-barrier film thus obtained were shown in Table 1.

COMPARATIVE EXAMPLE 2

A gas-barrier film was obtained in the same manner as in Example 1, except that the fine dispersion containing the polyvinyl alcohol and the stratified silicate obtained in Example 1 was coated on an anchor coating layer of a biaxially oriented polypropylene film coated thereon with the same anchor coating agent as in Example 1 so that a thickness of the gas-barrier layer after drying was 2.0 μm, and it was dried at 120° C. by hot air.

The measurement results of the gas-barrier film thus obtained were shown in Table 1.

COMPARATIVE EXAMPLE 3

1N-hydrochloric acid 40 parts by weight was added to 100 parts by weight of tetraethoxysilane and stirred at a room temperature to hydrolyze tetraethoxysilane, whereby a tetraethoxysilane-hydrolyzed solution was obtained. The above tetraethoxysilane-hydrolyzed solution was added to the fine dispersion containing the polyvinyl alcohol and the stratified silicate obtained in Example 1 in an amount of 127 parts by weight in terms of a silicon amount (reduced to $SiO_2$) originating in the silicon alkoxide per 100 parts by weight of the polyvinyl alcohol to obtain a mixed solution comprising the polyvinyl alcohol, the stratified silicate and the tetraethoxysilane-hydrolyzed solution. The above mixed solution was used to obtain a gas-barrier film in the same manner as in Example 1.

The measurement results of the gas-barrier film thus obtained were shown in Table 1.

COMPARATIVE EXAMPLE 4

In Example 1, tetraethoxysilane was added in an amount of 530 parts by weight in terms of a silicon amount (reduced to $SiO_2$) originating in the silicon alkoxide per 100 parts by weight of the polyvinyl alcohol and stirred at a room temperature to hydrolyze tetraethoxysilane, but deposits were generated, and a gas-barrier coating agent was not obtained.

TABLE 1

| Example | Oxygen permeability Q (ml/m² · day · atm) | 2.5/(γ/90 + α) (ml/m² · day · atm) | Rg (μm) | $d_{ND}$ (nm) | $d_{IP}$ (nm) |
|---|---|---|---|---|---|
| Example 1 | 0.2 | 1.1 | 1.8 | 5.9 | 6.4 |
| Example 2 | 0.8 | 1.1 | 1.9 | 5.9 | 6.1 |
| Example 3 | 1.1 | 1.1 | 2.3 | 6.0 | 6.0 |
| Example 4 | 0.9 | 1.1 | 1.9 | 6.0 | 6.0 |
| Example 5 | 1.0 | 1.1 | 1.9 | 6.1 | 6.2 |
| Example 6 | 1.0 | 1.1 | 1.9 | 6.1 | 6.1 |
| Example 7 | 0.1 | 1.1 | 1.7 | 5.6 | 6.5 |
| Example 8 | 0.8 | 1.1 | 2.1 | 5.8 | 6.4 |
| Example 9 | 0.2 | 1.1 | 1.8 | 5.8 | 6.4 |
| Example 10 | 0.2 | 1.1 | 1.8 | 5.6 | 6.6 |
| Example 11 | 0.4 | 1.1 | 1.8 | 5.7 | 6.3 |
| Example 12 | 0.4 | 1.1 | 1.8 | 5.7 | 6.2 |
| Example 13 | 0.1 | 1.2 | 1.7 | 5.6 | 6.4 |
| Example 14 | 0.3 | 1.1 | 1.8 | 5.9 | 6.4 |
| Example 15 | 0.2 | 1.1 | 1.8 | 5.5 | 6.3 |
| Example 16 | 0.3 | 1.1 | 1.9 | 6.0 | 6.3 |
| Example 17 | 0.1 | 1.1 | 1.8 | 5.5 | 6.4 |
| Example 18 | 0.1 | 1.1 | 1.8 | 5.5 | 6.4 |
| Example 19 | 0.2 | 1.1 | 1.7 | 5.3 | 6.1 |
| Example 20 | 0.2 | 1.1 | 1.7 | 5.6 | 6.3 |
| Example 21 | 1.1 | 1.1 | 1.9 | 6.0 | 6.0 |
| Example 22 | 0.3 | 2.0 | 1.8 | 5.3 | 6.1 |
| Comparative Example 1 | 10 | 1.1 | 3.3 | Not detected* | 6.0 |
| Comparative Example 2 | 40 | 1.1 | 3.2 | Not detected* | Not detected* |
| Comparative Example 3 | 6.2 | 1.1 | 2.8 | 7.8 | 8.2 |

*Not detected in a peak position of 10 nm or less

EXAMPLE 23

An adhesive for dry laminating (manufactured by Toyo Morton Co., Ltd., TM329/CAT-8B=1 part by weight/1 part by weight was adjusted by ethyl acetate so that nonvolatile matters accounted for 10% by weight) was coated on the gas-barrier layer of the gas-barrier film obtained in Example 1 so that a dry weight was 2 g/m², and it was dried at 90° C. for 2 minutes. Then, a non-stretched polyethylene film of 40 μm was laminated on the above adhesive face for dry laminating, whereby a non-stretched polyethylene film-laminated gas-barrier film was obtained.

The measurement results of the gas-barrier film thus obtained were shown in Table 2.

EXAMPLE 24

A non-stretched polyethylene film-laminated gas-barrier film was obtained in the same manner as in Example 23, except that the gas-barrier film obtained in Example 2 was used.

The measurement results of the gas-barrier film thus obtained were shown in Table 2.

EXAMPLE 25

A non-stretched polyethylene film-laminated gas-barrier film was obtained in the same manner as in Example 23, except that the gas-barrier film obtained in Example 3 was used.

The measurement results of the gas-barrier film thus obtained were shown in Table 2.

EXAMPLE 26

A non-stretched polyethylene film-laminated gas-barrier film was obtained in the same manner as in Example 23, except that the gas-barrier film obtained in Example 4 was used.

The measurement results of the gas-barrier film thus obtained were shown in Table 2.

EXAMPLE 27

A non-stretched polyethylene film-laminated gas-barrier film was obtained in the same manner as in Example 23, except that the gas-barrier film obtained in Example 5 was used.

The measurement results of the gas-barrier film thus obtained were shown in Table 2.

EXAMPLE 28

A non-stretched polyethylene film-laminated gas-barrier film was obtained in the same manner as in Example 23, except that the gas-barrier film obtained in Example 6 was used.

The measurement results of the gas-barrier film thus obtained were shown in Table 2.

EXAMPLE 29

A non-stretched polyethylene film-laminated gas-barrier film was obtained in the same manner as in Example 23, except that the gas-barrier film obtained in Example 7 was used.

The measurement results of the gas-barrier film thus obtained were shown in Table 2.

EXAMPLE 30

A non-stretched polyethylene film-laminated gas-barrier film was obtained in the same manner as in Example 23, except that the gas-barrier film obtained in Example 8 was used.

The measurement results of the gas-barrier film thus obtained were shown in Table 2.

EXAMPLE 31

A non-stretched polyethylene film-laminated gas-barrier film was obtained in the same manner as in Example 23, except that the gas-barrier film obtained in Example 9 was used.

The measurement results of the gas-barrier film thus obtained were shown in Table 2.

EXAMPLE 32

A non-stretched polyethylene film-laminated gas-barrier film was obtained in the same manner as in Example 23, except that the gas-barrier film obtained in Example 10 was used.

The measurement results of the gas-barrier film thus obtained were shown in Table 2.

EXAMPLE 33

A non-stretched polyethylene film-laminated gas-barrier film was obtained in the same manner as in Example 23, except that the gas-barrier film obtained in Example 11 was used.

The measurement results of the gas-barrier film thus obtained were shown in Table 2.

EXAMPLE 34

A non-stretched polyethylene film-laminated gas-barrier film was obtained in the same manner as in Example 23, except that the gas-barrier film obtained in Example 12 was used.

The measurement results of the gas-barrier film thus obtained were shown in Table 2.

EXAMPLE 35

A non-stretched polyethylene film-laminated gas-barrier film was obtained in the same manner as in Example 23, except that the gas-barrier film obtained in Example 13 was used.

The measurement results of the gas-barrier film thus obtained were shown in Table 2.

EXAMPLE 36

A non-stretched polyethylene film-laminated gas-barrier film was obtained in the same manner as in Example 23, except that the gas-barrier film obtained in Example 14 was used.

The measurement results of the gas-barrier film thus obtained were shown in Table 2.

EXAMPLE 37

A non-stretched polyethylene film-laminated gas-barrier film was obtained in the same manner as in Example 23, except that the gas-barrier film obtained in Example 15 was used.

The measurement results of the gas-barrier film thus obtained were shown in Table 2.

EXAMPLE 38

A non-stretched polyethylene film-laminated gas-barrier film was obtained in the same manner as in Example 23, except that the gas-barrier film obtained in Example 16 was used.

The measurement results of the gas-barrier film thus obtained were shown in Table 2.

EXAMPLE 39

A non-stretched polyethylene film-laminated gas-barrier film was obtained in the same manner as in Example 23, except that the gas-barrier film obtained in Example 17 was used.

The measurement results of the gas-barrier film thus obtained were shown in Table 2.

EXAMPLE 40

A non-stretched polyethylene film-laminated gas-barrier film was obtained in the same manner as in Example 23, except that the gas-barrier film obtained in Example 18 was used.

The measurement results of the gas-barrier film thus obtained were shown in Table 2.

EXAMPLE 41

A non-stretched polyethylene film-laminated gas-barrier film was obtained in the same manner as in Example 23, except that the gas-barrier film obtained in Example 19 was used.

The measurement results of the gas-barrier film thus obtained were shown in Table 2.

EXAMPLE 42

A non-stretched polyethylene film-laminated gas-barrier film was obtained in the same manner as in Example 23, except that the gas-barrier film obtained in Example 20 was used.

The measurement results of the gas-barrier film thus obtained were shown in Table 2.

EXAMPLE 43

A non-stretched polyethylene film-laminated gas-barrier film was obtained in the same manner as in Example 23, except that the gas-barrier film obtained in Example 21 was used.

The measurement results of the gas-barrier film thus obtained were shown in Table 2.

EXAMPLE 44

A non-stretched polyethylene film-laminated gas-barrier film was obtained in the same manner as in Example 23, except that the gas-barrier film obtained in Example 22 was used.

The measurement results of the gas-barrier film thus obtained were shown in Table 2.

COMPARATIVE EXAMPLE 5

A non-stretched polyethylene film-laminated gas-barrier film was obtained in the same manner as in Example 23, except that the gas-barrier film obtained in Comparative Example 1 was used.

The measurement results of the gas-barrier film thus obtained were shown in Table 2.

COMPARATIVE EXAMPLE 6

A non-stretched polyethylene film-laminated gas-barrier film was obtained in the same manner as in Example 23, except that the gas-barrier film obtained in Comparative Example 2 was used.

The measurement results of the gas-barrier film thus obtained were shown in Table 2.

COMPARATIVE EXAMPLE 7

A non-stretched polyethylene film-laminated gas-barrier film was obtained in the same manner as in Example 23, except that the gas-barrier film obtained in Comparative Example 3 was used.

The measurement results of the gas-barrier film thus obtained were shown in Table 2.

REFERENCE EXAMPLE 1

The adhesive for dry laminating was coated on a vinylidene chloride-coated layer of a vinylidene chloride-coated OPP film of 22 μm (Cenesi KOP name: HB60, manufactured by Daicel Chemical Ind. Co., Ltd.) in the same manner as in Example 23 and dried, and a non-stretched polyethylene film of 40 μm was laminated on the above adhesive face, whereby a non-stretched polyethylene film-laminated gas-barrier film was obtained.

The measurement results of the gas-barrier film thus obtained were shown in Table 2.

TABLE 2

| Example | Oxygen permeability Q' after hot water treatment (ml/ m² · day · atm) | $100/(\gamma/90 + \alpha)$ (ml/m² · day · atm) | $d_{ND}$ (nm) | $d_{IP}$ (nm) |
|---|---|---|---|---|
| Example 23 | 8 | 37 | 5.9 | 6.4 |
| Example 24 | 13 | 37 | 5.9 | 6.1 |
| Example 25 | 20 | 37 | 6.0 | 6.0 |
| Example 26 | 15 | 37 | 6.0 | 6.0 |
| Example 27 | 20 | 37 | 6.1 | 6.2 |
| Example 28 | 20 | 37 | 6.1 | 6.1 |
| Example 29 | 5 | 37 | 5.6 | 6.5 |
| Example 30 | 10 | 37 | 5.8 | 6.4 |
| Example 31 | 7 | 37 | 5.8 | 6.4 |
| Example 32 | 5 | 37 | 5.6 | 6.6 |
| Example 33 | 6 | 37 | 5.7 | 6.3 |
| Example 34 | 6 | 37 | 5.7 | 6.2 |
| Example 35 | 5 | 38 | 5.6 | 6.4 |
| Example 36 | 8 | 38 | 5.9 | 6.4 |
| Example 37 | 3 | 37 | 5.5 | 6.3 |
| Example 38 | 25 | 37 | 6.0 | 6.3 |
| Example 39 | 3 | 37 | 5.5 | 6.4 |
| Example 40 | 3 | 37 | 5.5 | 6.4 |
| Example 41 | 1 | 37 | 5.3 | 6.1 |
| Example 42 | 9 | 37 | 5.6 | 6.3 |
| Example 43 | 21 | 37 | 6.0 | 6.0 |
| Example 44 | 2 | 59 | 5.3 | 6.1 |
| Comparative Example 5 | 200 | 37 | Not detected* | 6.0 |

TABLE 2-continued

| Example | Oxygen permeability Q' after hot water treatment (ml/ m² · day · atm) | 100/(γ/90 + α) (ml/m² · day · atm) | $d_{ND}$ (nm) | $d_{IP}$ (nm) |
|---|---|---|---|---|
| Comparative Example 6 | 500 | 37 | Not detected* | Not detected* |
| Comparative Example 7 | 90 | 37 | 7.8 | 8.2 |
| Reference Example 1 | 5 | 37 | — | — |

*Not detected in a peak position of 10 nm or less

The invention claimed is:

1. A gas-barrier film which is a laminate comprising a substrate layer comprising a thermoplastic resin film and a gas-barrier layer laminated thereon comprising a hydrolysate of a silicon alkoxide, a stratified silicate and a polyvinyl alcohol base resin, wherein a radius (Rg) of gyration of a scattering matter which is measured by light scattering in the gas-barrier layer described above is 2.4 μm or less, and the silicon alkoxide and/or a hydrolysate thereof are present between the layers of the stratified silicate present in the above gas-barrier layer, said gas-barrier film being produced by hydrolyzing a part or the whole part of a silicon alkoxide in the presence of a stratified silicate dispersed in an aqueous solution of a polyvinyl alcohol base resin in which a pH is controlled to 1 to 5, applying thus obtained aqueous solution on a substrate layer comprising a thermoplastic resin film and drying the same.

2. The gas-barrier film as described in claim 1, wherein a distance $d_{ND}$ between domains in a vertical direction to a film face in the gas-barrier layer which is measured by small angle X-ray scattering is 6.8 nm or less.

3. The gas-barrier film as described in claim 1, wherein silicon originating in the silicon alkoxide and the stratified silicate are present in the gas-barrier layer in a proportion of 90 to 500 parts by weight in terms of $SiO_2$ and 10 to 150 parts by weight respectively per 100 parts by weight of the polyvinyl alcohol base resin.

4. The gas-barrier film as described in claim 1, wherein the gas-barrier layer further comprises polyethylene oxide.

5. The gas-barrier film as described in claim 4, wherein silicon originating in the silicon alkoxide, the stratified silicate and the polyethylene oxide are present in the gas-barrier layer in a proportion of 90 to 500 parts by weight in terms of $SiO_2$, 10 to 150 parts by weight and 0.1 to 5 parts by weight respectively per 100 parts by weight of the polyvinyl alcohol base resin.

6. The gas-barrier film as described in claim 1, wherein the gas-barrier layer is laminated on the substrate layer via an anchor coating layer.

7. The gas-barrier film as described in claim 1, wherein a sealing layer comprising a thermoplastic resin having a lower melting point than that of the thermoplastic resin constituting the substrate layer is provided on a face opposite to a face on which the above substrate layer in the gas-barrier layer is laminated.

8. A gas-barrier coating agent comprising a hydrolysate of a silicon alkoxide, a stratified silicate and a polyvinyl alcohol base resin, wherein an aqueous solution is obtained by hydrolyzing a part or the whole of the silicon alkoxide in the presence of the stratified silicate dispersed in an aqueous solution of the polyvinyl alcohol base resin in which a pH is controlled to 1 to 5.

9. The gas-barrier coating agent as described in claim 8, comprising silicon originating in the silicon alkoxide and the stratified silicate in a proportion of 90 to 500 parts by weight in terms of $SiO_2$ and 10 to 150 parts by weight respectively per 100 parts by weight of the polyvinyl alcohol base resin.

10. The gas-barrier coating agent as described in claim 8, further comprising an aqueous solution obtained by adding polyethylene oxide before or after hydrolyzing the silicon alkoxide.

11. The gas-barrier coating agent as described in claim 10, comprising silicon originating in the silicon alkoxide, the stratified silicate and the polyethylene oxide in a proportion of 90 to 500 parts by weight in terms of $SiO_2$, 10 to 150 parts by weight and 0.1 to 5 parts by weight respectively per 100 parts by weight of the polyvinyl alcohol base resin.

12. The gas-barrier coating agent as described in claim 8, wherein the pH is controlled by ion exchange.

13. A production process for a gas-barrier film which is a laminate comprising a substrate layer comprising a thermoplastic resin film and a gas-barrier layer laminated thereon comprising a hydrolysate of a silicon alkoxide, a stratified silicate and a polyvinyl alcohol base resin, wherein a radius (Rg) of gyration of a scattering matter which is measured by light scattering in the gas-barrier layer described above is 2.4 μm or less, and the silicon alkoxide and/or a hydrolysate thereof are present between the layers of the stratified silicate present in the above gas-barrier layer, wherein the gas-barrier coating agent as described in claim 12 is coated on a substrate layer comprising a thermoplastic resin film and dried to form a gas-barrier layer.

14. The production process for the gas-barrier film as described in claim 13, wherein the film is subjected to aging treatment under the atmosphere of a temperature of 30 to 80° C. and a relative humidity of 30 to 100% RH.

15. A production process for the gas-barrier coating agent as described in claim 8, which comprises hydrolyzing a part or the whole part of a silicon alkoxide in the presence of a stratified silicate dispersed in an aqueous solution of a polyvinyl alcohol base resin in which a pH is controlled to 1 to 5.

16. The process as described in claim 15, obtaining the gas-barrier coating agent comprising silicon originating in the silicon alkoxide and the stratified silicate in a proportion of 90 to 500 parts by weight in terms of $SiO_2$ and 10 to 150 parts by weight respectively per 100 parts by weight of the polyvinyl alcohol base resin.

17. The production process for the gas-barrier coating agent as described in claim 15, which comprises further adding polyethylene oxide before or after hydrolyzing the silicon alkoxide.

18. The process as described in claim 17, obtaining the gas-barrier coating agent comprising silicon originating in the silicon alkoxide, the stratified silicate and the polyethylene oxide in a proportion of 90 to 500 parts by weight in terms of $SiO_2$, 10 to 150 parts by weight and 0.1 to 5 parts by weight respectively per 100 parts by weight of the polyvinyl alcohol base resin.

19. The production process for the gas-barrier coating agent as described in claim 15, wherein a pH of the aqueous solution of the polyvinyl alcohol base resin in which the stratified silicate is dispersed is controlled to 1 to 5 by ion exchange, and then the above aqueous solution is mixed with the silicon alkoxide to hydrolyze a part or the whole part of silicon alkoxide.

20. A gas-barrier film which is a laminate comprising a substrate layer comprising a thermoplastic resin film and a gas-barrier layer laminated thereon comprising a hydrolysate of a silicon alkoxide, a stratified silicate and a polyvinyl alcohol base resin, wherein a radius (Rg) of gyration of a scattering matter which is measured by light scattering in the gas-barrier layer described above is 2.4 μm or less, and the silicon alkoxide and/or a hydrolysate thereof are present between the layers of the stratified silicate present in the above gas-barrier layer, said gas-barrier film being produced by hydrolyzing a part or the whole part of a silicon alkoxide in the presence of a stratified silicate dispersed in an aqueous solution of a polyvinyl alcohol base resin in which a pH is controlled to 1 to 5, applying thus obtained aqueous solution on a substrate layer comprising a thermoplastic resin film, drying the same, and then subjecting the resulting film to aging treatment under an atmosphere of a temperature of 30 to 80° C. and a relative humidity of 30 to 100% RH.

* * * * *